United States Patent
Yamazaki (10) Patent No.: US 10,191,704 B2
(45) Date of Patent: Jan. 29, 2019

(54) INFORMATION PROCESSING APPARATUS READING DATA CREATED BY RENDER FILTER FOR IMAGE FORMATION FROM STORAGE AREA AND SAVING THE DATA IN TEMPORARY STORAGE AREA

(71) Applicant: CANON KABUSHIKI KAISHA, Tokyo (JP)

(72) Inventor: Shinya Yamazaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/695,407

(22) Filed: Sep. 5, 2017

(65) Prior Publication Data

US 2018/0081611 A1 Mar. 22, 2018

(30) Foreign Application Priority Data

Sep. 20, 2016 (JP) .................................. 2016-183102

(51) Int. Cl.
 *G06F 3/12* (2006.01)
 *G06F 8/61* (2018.01)

(52) U.S. Cl.
 CPC ............ *G06F 3/1274* (2013.01); *G06F 3/122* (2013.01); *G06F 3/1227* (2013.01); *G06F 3/1298* (2013.01); *G06F 8/62* (2013.01)

(58) Field of Classification Search
 CPC .................................................... G06F 3/1225
 See application file for complete search history.

(56) References Cited

U.S. PATENT DOCUMENTS

| | | | |
|---|---|---|---|
| 9,244,634 B2 | 1/2016 | Ebuchi et al. | |
| 2008/0285082 A1* | 11/2008 | Morooka | G06F 17/248 358/1.18 |
| 2010/0027040 A1* | 2/2010 | Kuroda | G03G 15/0173 358/1.9 |
| 2010/0118321 A1* | 5/2010 | Ebuchi | G06F 3/1204 358/1.9 |
| 2010/0309519 A1* | 12/2010 | Nishihara | G06F 3/1204 358/1.15 |
| 2011/0023054 A1* | 1/2011 | Yamazaki | G06F 3/1204 719/321 |
| 2012/0236332 A1* | 9/2012 | Yamazaki | H04N 1/00482 358/1.9 |

FOREIGN PATENT DOCUMENTS

JP 2012-053627 A 3/2012

* cited by examiner

*Primary Examiner* — Benjamin O Dulaney
(74) *Attorney, Agent, or Firm* — Venable, LLP (57) ABSTRACT

An object of the present invention is to prevent an unnecessary external file created by a printer driver from continuing to remain even in the case where processing unique to a vendor cannot be performed at the time of uninstallation of the printer driver. The present invention is an information processing apparatus installed with a driver that creates data for image formation and has a render filter that saves the created data in a storage area that is not deleted at the time of uninstallation of the driver, the apparatus including: a saving unit configured to read the data saved in the storage area and to save the data in a temporary storage area that is deleted at the time of uninstallation of the driver; and a deletion unit configured to delete the data from the storage area after the data is saved in the temporary storage area.

18 Claims, 9 Drawing Sheets

INFORMATION PROCESSING APPARATUS READING DATA CREATED BY RENDER FILTER FOR IMAGE FORMATION FROM STORAGE AREA AND SAVING THE DATA IN TEMPORARY STORAGE AREA

BACKGROUND OF THE INVENTION

Field of the Invention

The present invention relates to a technique to delete data for a printer driver created by a printer driver at the time of uninstallation of the printer driver.

Description of the Related Art

In general, a printer driver has a function to create print data that a printer can interpret by converting image data created by an application. However, in recent years, there are many printer drivers having a variety of functions, in addition to the function to create print data. For example, as described in Japanese Patent Laid-Open No. 2012-053627, a function of a printer driver is known that creates and saves form data. In Japanese Patent Laid-Open No. 2012-053627, in printing (decorative printing) to give decorativeness to printed matter by using a special color material, such as a transparent ink, form data is created, which specifies an area to which this special color material is applied. The printer driver saves this form data in advance as an external file and creates print data by combining image data and the form data at the time of actually performing decorative printing. On the other hand, such an external file is a dedicated file of the printer driver and is no longer necessary after the printer driver is uninstalled. Because of this, it is necessary to delete the external file at the time of uninstallation of the printer driver.

SUMMARY OF THE INVENTION

It is desirable for deletion of an external file to be performed as part of uninstallation processing of a printer driver. However, in general, the uninstallation processing of a printer driver is controlled by an operating system (OS). Because of this, whether processing unique to a vendor, such as deletion of an external file, can be performed at the time of uninstallation depends on the architectural specifications of the OS or the printer driver mounted on the OS. For example, in the case of the version 4 (v4) printer driver mounted on the Windows (registered trademark, omitted hereinafter) OS, it is not possible to perform processing unique to the vendor at the time of uninstallation.

Because of this, in the case of the printer driver such as this, it is not possible to delete the created external file at the time of uninstallation and there is such a problem that the unnecessary external file continues to remain. The present invention has been made in view of this problem and an object is to prevent an unnecessary external file from continuing to remain even in the case where it is not possible to perform processing unique to a vendor at the time of uninstallation of the printer driver.

The present invention is an information processing apparatus installed with a driver that creates data for image formation and has a render filter that saves the created data in a storage area that is not deleted at the time of uninstallation of the driver, the apparatus including: a saving unit configured to read the data saved in the storage area and to save the data in a temporary storage area that is deleted at the time of uninstallation of the driver; and a deletion unit configured to delete the data from the storage area after the data is saved in the temporary storage area.

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained in detail. The following embodiments are not intended to limit the present invention according to the scope of the claims and all the features explained below are not necessarily indispensable as the solution of the present invention.

First Embodiment

<About Hardware Configuration>

Figure 1:
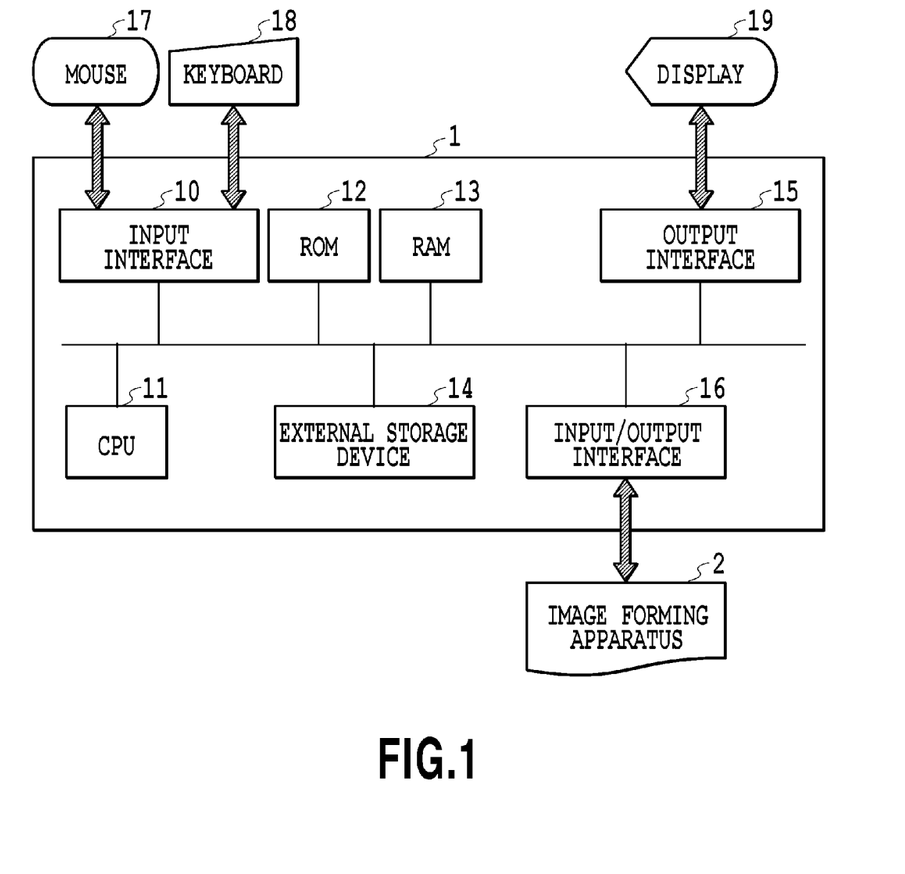
FIG. 1 is a block diagram showing a hardware configuration of an information processing apparatus 1 in a first embodiment.

FIG. 1 is a block diagram showing a hardware configuration of the information processing apparatus 1 in the present embodiment. It may also be possible to use, for example, a computer as the information processing apparatus 1. Hereinafter, the information processing apparatus is abbreviated to PC. As shown schematically, the PC 1 has an input interface (hereinafter, interface is abbreviated to IF) 10, a CPU 11, a ROM 12, a RAM 13, an external storage device 14, an output IF 15, and an input/output IF 16. To the input IF 10, input devices, such as a mouse 17 and a keyboard 18, are connected and the input IF 10 controls inputs from these input devices. To the output interface 15, an output device, such as a display 19, is connected and the output interface 15 controls an output to the output device.

In the ROM 12, programs and data for initialization are stored and in the external storage device 14, an application program group, an OS, a printer driver 220, and various kinds of data are stored. The RAM 13 is a storage medium to temporarily store data and functions as a main memory and a work area of the CPU 11. Specifically, for example, various programs stored in the ROM 12 and the external storage device 14 are loaded onto the RAM 13 and the loaded programs are executed by the CPU 11. In the present embodiment, programs stored in at least one of the ROM 12 and the external storage device 14 are loaded onto the RAM 13 and by the CPU 11 executing the loaded programs, the functions in the PC 1, to be described later, are implemented and the processing in accordance with a flow, to be described later, is performed. An image forming apparatus 2 is connected with the PC 1 via the input/output interface 16. The image forming apparatus is not limited to a dedicated apparatus specialized in the printing function and includes a multi function printer that combines the printing function and other functions, and a manufacturing apparatus that forms an image and a pattern on a printing medium. Here, the PC 1 and the image forming apparatus 2 are made up separately, but it may also be possible to make up these apparatuses as one information processing apparatus or one image forming apparatus.

<About Function Configuration>

Figure 2:
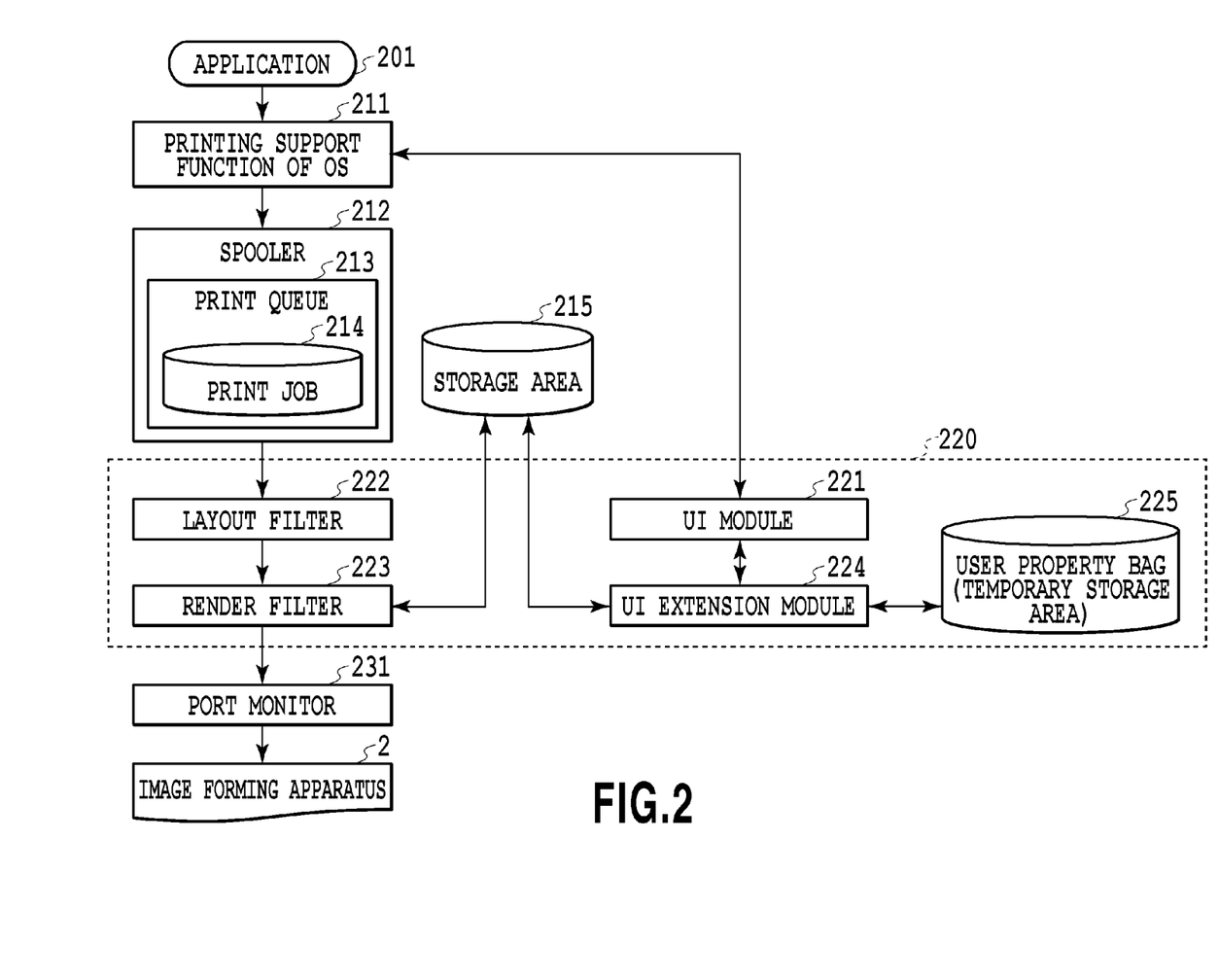
FIG. 2 is a block diagram showing a function configuration of the information processing apparatus 1 in the first embodiment.

FIG. 2 is a diagram showing an example of a function configuration of the PC 1 in the present embodiment and is a diagram for explaining mainly the function of the printer driver 220 that is installed in the PC 1. In the following, explanation is given by taking the case as an example where the OS that is mounted on the PC 1 is Windows of Microsoft Corporation and the printer driver 220 is the Version 4 (v4) printer driver.

An application 201 includes software, such as image processing software, a word processor, and a web browser. The application 201 edits and processes drawing data including text data of such as a character, graphics data of such as a graphics, and image data of such as a photo in accordance with an input of a user. Then, in accordance with an input of a user, the application 201 requests the OS to perform image forming processing (including printing processing) based on the edited and processed drawing data, i.e., outputs data including a print ticket to the OS.

Figure 3A:
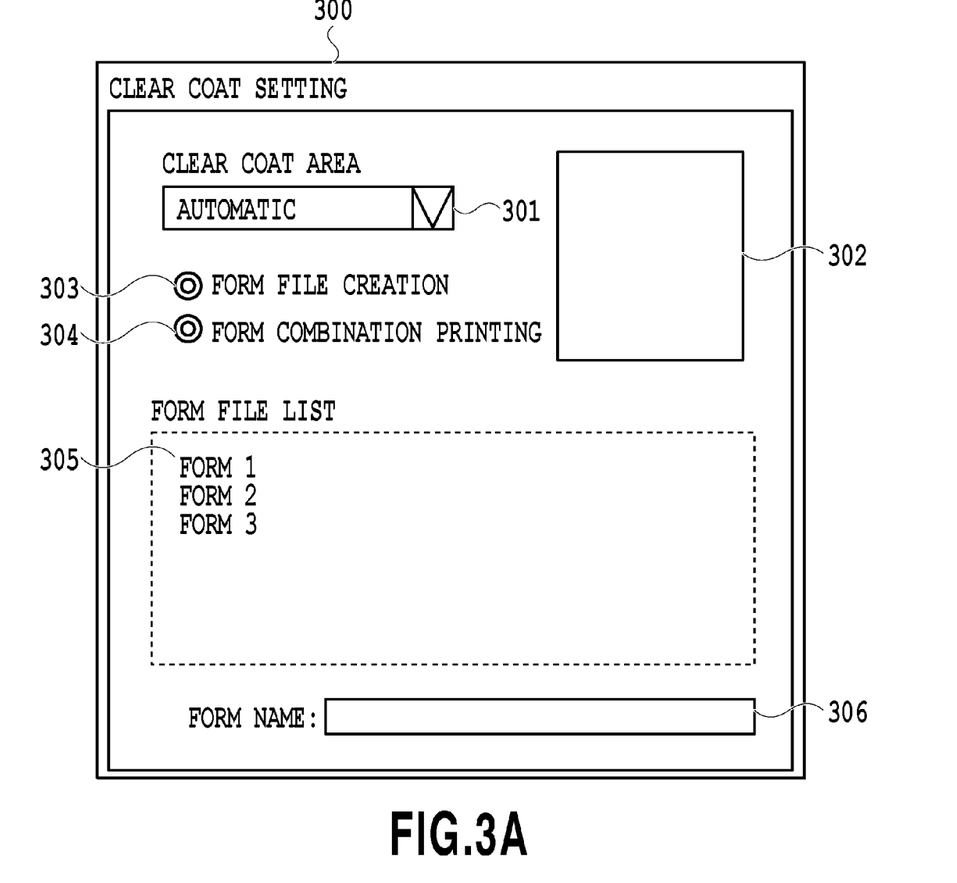
FIG. 3A and FIG. 3B are diagrams showing an example of a GUI screen on which to set print setting information in the first embodiment.

The data that is output by the application 201 is data in the XPS format and is a drawing command group consisting of a text drawing command corresponding to text data, a graphics drawing command corresponding to graphics data, and an image drawing command corresponding to image data. In the print ticket included in the data that is output by the application 201, print setting information based on an input of a user via a GUI screen or the like shown in FIG. 3A is described. The print setting information includes, for example, the sheet size and sheet type, image processing parameters, and so on. Further, the print setting information of the present embodiment also includes information (flag) indicating whether the print job is a job to create form data, a print job by which combination of already-created form data is performed, or a normal print job by which combination of form data is not performed. Furthermore, it may also be possible for the print setting information of the present embodiment to include a form data name of form data. The form data will be described later.

The OS converts a drawing command group that is input from the application 201 into spool data via a printing support function 211 of the OS. This spool data is temporarily saved in a print queue 213 of a spooler 212 and managed as a print job 214 by the spooler 212. The print job 214 is converted into print data (PDL data) that the image forming apparatus 2 can interpret by the printer driver 220, and then transmitted to the image forming apparatus 2, and the image forming apparatus 2 forms an image on a printing medium based on the transmitted print data.

In the following, each module of the printer driver 220 is explained. A UI module 221 is a module to provide limited functions in conformity with the OS. The UI extension module 224 is a module to implement an extension function unique to the vendor. A user property bag 225 is an area (temporary storage area) to temporarily store data or the like that is input by a user. It is possible for the UI module 221 and the UI extension module 224 to read data that is from the user property bag 225 and to write data to the user property bag 225. On the other hand, it is not possible for a layout filter 222 and the render filter 223, to be described later, to access the user property bag 225. The user property bag 225 is deleted at the time of uninstallation of the printer driver 220.

The print job 214 that is delivered to the printer driver 220 is first processed by the layout filter 222. Here, the filter is a module that performs processing for data that is input, performs processing, such as conversion, in accordance with the input data, and outputs the data for which the processing has been performed. Each filter making up the printer driver 220 is called by a filter management module (not shown schematically) of the OS at the time of despool of the print job 214 and initialization is performed.

The layout filter 222 performs layout processing, such as processing to rearrange pages and processing to put together a plurality of pages, in accordance the print setting information and outputs the data after the processing to the render filter 223. As described above, it is not possible for the layout filter 222 to access the user property bag 225.

The render filter 223 performs processing for the data that is input from the layout filter 222. As described above, the print job is one of the job to create form data, the print job by which combination of already-created form data is performed, and the normal print job and the render filter 223 performs different processing in accordance with the kind of the processing-target print job. Specifically, in the case where the processing-target print job is the normal print job, the render filter 223 converts the print data in accordance with the print setting information. In detail, the render filter 223 creates print data in the PDL format that the image forming apparatus 2 can interpret based on the print setting information and the print data in the XPS format for which layout has already been performed. The print data in the PDL format created by the render filter 223 is transmitted to the image forming apparatus 2 via a port monitor 231.

Further, in the case where the processing-target print job is the job to create form data, the render filter 223 creates form data and saves the created form data in a storage area 215. In this case, transmission of the print data to the image forming apparatus 2 is not performed. Here, the storage area 215 is an area that is provided, for example, in the ROM 12 and the like and is an area that is not deleted at the time of uninstallation of the printer driver 220.

Furthermore, in the case where the processing-target print job is the print job by which combination of form data is performed, the render filter 223 reads form data to be used from the storage area 215. Then, the render filter 223 creates PDL data based on the form data, the print setting information, and the print data in the XPS format for which layout has already been performed. This print data in the PDL format is transmitted to the image forming apparatus 2 via the port monitor 231.

As described above, it is not possible for the render filter 223 to access the user property bag 225.

<About GUI Screen to Set Print Setting Information>

FIG. 3A is a diagram showing an example of a GUI screen on which to set print setting information that the UI module 221 of the printer driver 220 displays on the display 19, and specifically, is a diagram showing a dialog box for a clear coat setting. A pulldown menu 301 is a portion to select a "transparent ink application mode" to determine an application method of a transparent ink. By a user displaying a list of transparent ink application modes that the printer driver 220 provides in this pulldown menu 301 and selecting an arbitrary transparent ink application mode, a transparent ink application mode is set.

Figure 3B:
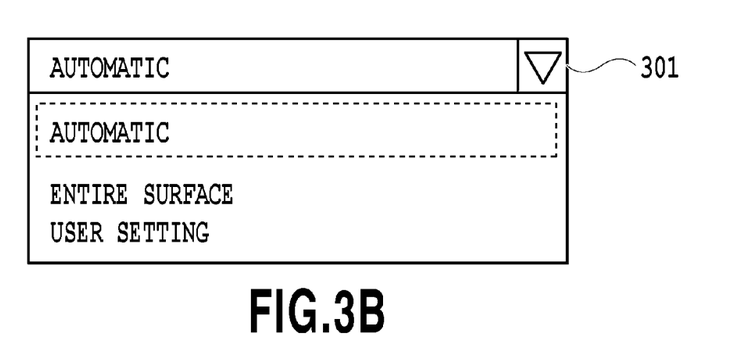

As the transparent ink application mode, three modes, i.e., "Automatic", "Entire surface", and "User setting", exist as shown in FIG. 3B and a user specifies a transparent ink application method by selecting an arbitrary mode from the pulldown menu 301. As a default, "Automatic" is selected for the transparent ink application mode. In the following, each of the transparent ink application modes is explained.

The "Automatic" application mode is a mode in which no transparent ink is applied in the case where a printing medium to be used is a medium that is not expected to bring a significant effect even by applying a transparent ink, but a transparent ink is applied in the case where a printing medium to be used is a medium that is expected to bring an effect by applying a transparent ink. The "Entire surface" application mode is a mode in which a transparent ink is applied to the entire range on a printing medium, in which the image forming apparatus 2 can form an image. The "User setting" application mode is a mode in which design properties are attached to printed matter by changing its appearance by not applying a transparent ink partially. As the "User setting" application mode, a "Form file creation mode" in which a form file is created and a "Form combination printing mode" in which printing is performed by using an already-created form file.

An icon display area 302 is an area that displays an icon representing a concept of the selected transparent ink application mode. Radio buttons 303 and 304 are buttons to select one of the "Form file creation mode" and the "Form combination printing mode" and they can be selected in the case where the "User setting" application mode is selected in the pulldown menu 301. In an area 305, already-created form files are displayed and in the case where the radio button 304 is selected, it is made possible to select one form file from among the displayed form files. An input box 306 is a box in which a form data name is input in order to identify a form file to be created.

<About Processing Performed by Render Filter>

Figure 4:
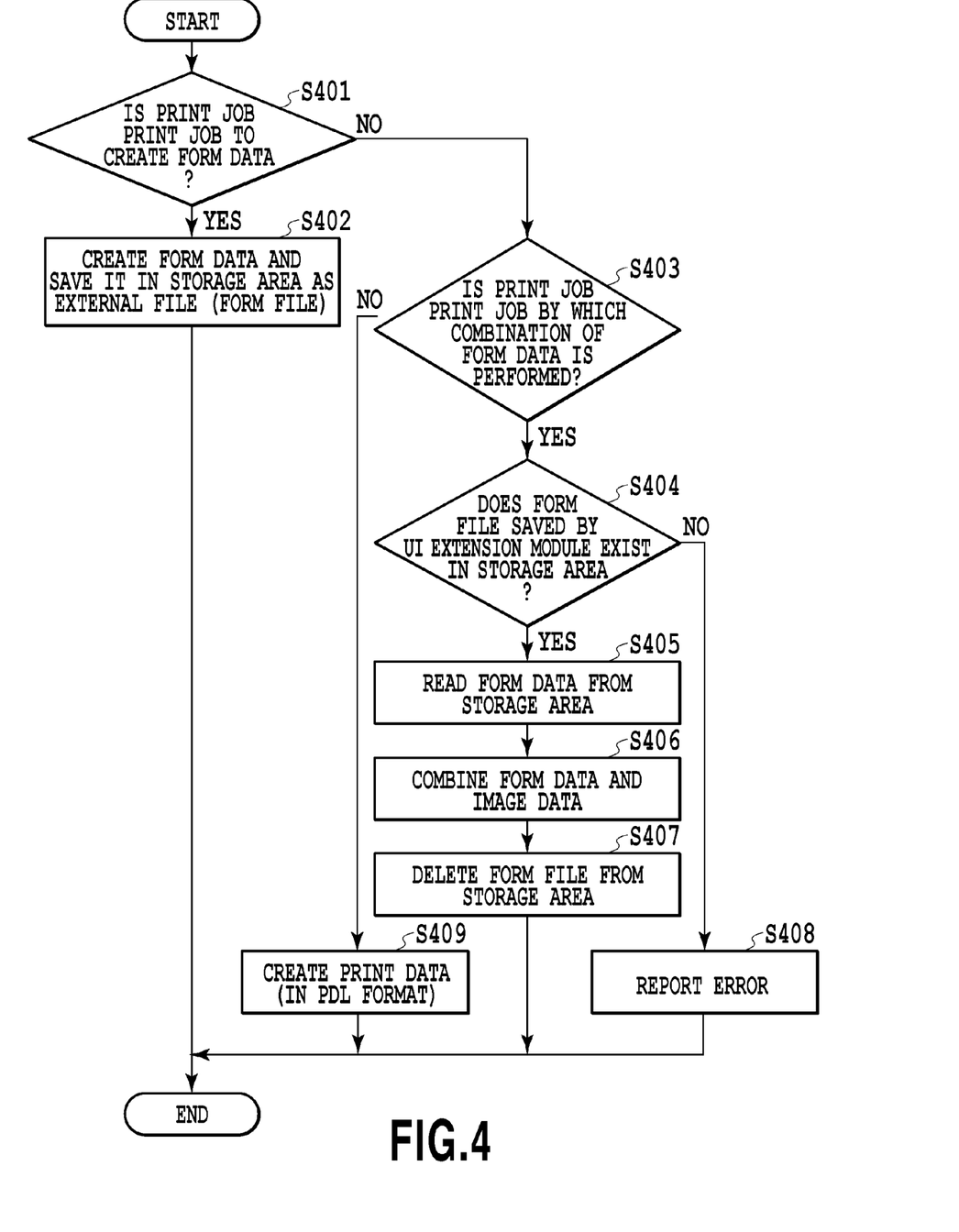
FIG. 4 is a flowchart of processing that is performed by a render filter 223 in the first embodiment.

FIG. 4 is a flowchart of processing that is performed by the render filter 223 in the present embodiment.

At step S401, the render filter 223 determines whether the processing-target print job is a job to create form data based on the print setting information included in the print job. In the case where the results of the determination at step S401 are affirmative, the processing advances to step S402. On the other hand, in the case where the results of the determination are negative, the processing advances to step S403.

At step S402, the render filter 223 creates form data and saves the form data and a form data name included in the print setting information together in the storage area 215 as one external file (form file). In the present embodiment, the external file refers to a file that is saved in the storage area 215 that is not deleted at the time of uninstallation of the printer driver 220. Further, as the file name of the form file that is saved at this step, a unique name is given so that it is known that the form file is saved by the render filter 223.

At step S403, the render filter 223 determines whether the processing-target print job is a print job by which combination of form data is performed, based on the print setting information included in the print job. In the case where the results of the determination at step S403 are affirmative, the processing advances to step S404. On the other hand, in the case where the results of the determination are negative, the processing advances to step S409.

At step S404, the render filter 223 determines whether the form file including form data, which is saved by the UI extension module 224 at step S509, to be described later, exists in the storage area 215 by using the file name. This form file will be described later by using FIG. 5. In the case where the results of the determination at step S404 are affirmative, the processing advances to step S405. On the other hand, in the case where the results of the determination are negative, the processing advances to step S408.

At step S405, the render filter 223 reads form data from the storage area 215, which is included in the form file having the form data name that coincides with the form data name included in the print setting information.

At step S406, the render filter 223 combines the form data acquired at step S405 and the image data and creates print data in the PDL format.

At step S407, the render filter 223 deletes the form file from the storage area 215, which is saved by the UI extension module 224 and which has the form data name that coincides with the form data name included in the print setting information.

In the case where the form file saved by the UI extension module 224 does not exist in the storage area 215 (in the case of NO at step S404), the render filter 223 reports an error by using the UI module 221 at step S408. This error indicates that the form file specified by a user does not exist.

In the case where the processing-target print job is a normal print job (in the case of NO at step S403), the render filter 223 creates print data in the PDL format at step S409. The above is the processing that is performed by the render filter 223 in the present embodiment.

<About Processing Performed by UI Extension Module>

Figure 5:
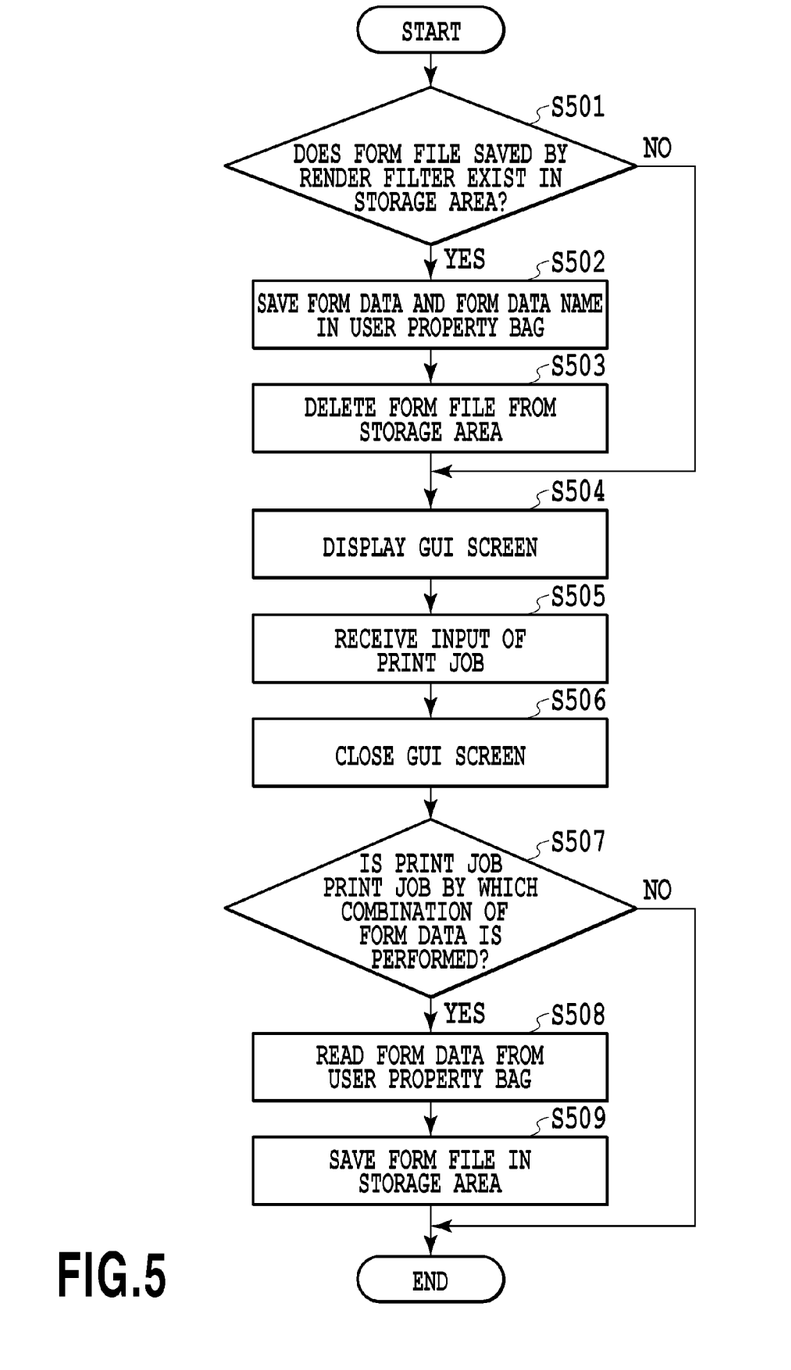
FIG. 5 is a flowchart of processing that is performed by a UI extension module 224 in the first embodiment.

FIG. 5 is a flowchart of processing that is performed by the UI extension module 224 in the present embodiment. The following processing starts at the timing of activation of the UI extension module 224, i.e., the timing at which the UI opens, and therefore, the processing starts at the timing before the activation of the render filter 223 that is initialized at the time of despool of the print job 214. Consequently, in the case where, for example, the render filter 223 saves the external file in the storage area 215 (step S402), the following processing starts at the timing of activation of the UI extension module 224 after the series of processing by the render filter 223 is completed.

At step S501, the UI extension module 224 determines whether the form file that is created and saved by the render filter 223 at step S402 exists in the storage area 215. This determination is performed based on the file name of the form file saved in the storage area 215. In the case where the results of the determination at step S501 are affirmative, the processing advances to step S502. On the other hand, in the case where the results of the determination are negative, the processing advances to step S504.

At step S502, the UI extension module 224 reads the form file that is created by the render filter 223 and which is saved in the storage area 215. Then, the UI extension module 224 saves the form data included in the form file and the form data name corresponding thereto together in the user property bag 225 as one form file.

At step S503, the UI extension module 224 deletes the form file read at step S502 from the storage area 215.

After this, at step S504, the UI extension module 224 displays a GUI screen for a user to input a print job. This GUI screen is, for example, a GUI screen 300 shown in FIG.

3A. In the case of displaying the GUI screen 300, the UI extension module 224 determines the contents to be displayed in the area 305 based on the form data name of the form file saved in the user property bag 225.

At step S505, the UI extension module 224 receives an input of a print job by a user. By this step, the print job to be handled in the subsequent processing is settled. In the case where the print job that is received at this step is a print job by which combination of form data is performed, the form data name of the form file that a user selects via the area 305 of the GUI screen 300 is included in the print setting information making up the print job.

At step S506, the UI extension module 224 closes the GUI screen on which to input a print job.

At step S507, the UI extension module 224 determines whether the processing-target print job is a print job by which combination of form data is performed, based on the print setting information included in the print job. In the case where the results of the determination at step S507 are affirmative, the processing advances to step S508. On the other hand, in the case where the results of the determination are negative, the series of processing ends.

At step S508, the UI extension module 224 reads form data included in one of the form files saved in the user property bag 225. In detail, the UI extension module 224 reads the form data corresponding to the same form data name as the form data name by using the form data name included in the print setting information making up the print job.

At step S509, the UI extension module 224 saves the form data read at step S508 and the form data name included in the print setting information making up the print job together in the storage area 215 as one external file (form file). The form file that is saved here will be a candidate of the form file including the form data that is read by the render filter 223 at step S405 described previously. As the file name of the form file that is saved at this step, a unique name is given so that it is known that the form file is saved by the UI extension module 224. The above is the processing that is performed by the UI extension module 224 in the present embodiment.

In the present embodiment, the information on the form file saved in the storage area 215 by the render filter 223 is moved to the user property bag 225 at the time of activation of the UI extension module 224. Further, the form file that is saved in the storage area 215 by the UI extension module 224 is deleted after the render filter 223 reads the form data included in the form file (step S407). Consequently, the form file that is saved in the storage area 215 that is not deleted at the time of uninstallation of the printer driver 220 is deleted each time the UI extension module 224 is activated or each time the render filter 223 reads the form data. Consequently, it is possible to prevent the dedicated form file of the printer driver 220 from continuing to remain in the storage area 215 after the uninstallation of the printer driver 220. Further, in the present embodiment, it is possible for the render filter 223 and the UI extension module 224 to perform the form file deletion processing described above as part of the normal printing processing flow, and therefore, affinity with the OS processing is also high.

In the above-described explanation, the form file that is saved in the storage area 215 by the UI extension module 224 is deleted from the storage area 215 by the render filter 223 after the combination processing of the image data and the form data included in the form file is performed. However, there is a case where a problem arises because the print setting information at the time of printing of the previous time is maintained in some photo applications and the like at a later time at which a user performs printing processing without opening the GUI screen of the printer driver 220 from the application. That is, in the case where an attempt is made to use again the form data included in the already-deleted form file, the printing processing by which combination of the form data is performed, will fail. In order to avoid such a case, an aspect is considered in which the deletion of form data is performed at all times only by the UI extension module 224. In this case, the UI extension module 224 operates so as to delete not only the form file saved by the render filter 223 but also the form file saved by the UI extension module 224 itself from the storage area 215.

Second Embodiment

In the first embodiment, after the render filter 223 creates form data and saves the form data in the storage area 215 as a form file, there is a possibility that the printer driver is uninstalled before the UI extension module 224 is activated. In this case, the form file saved in the storage area 215 by the render filter 223 is not deleted and continues to remain. In the present embodiment, by synchronizing the processing of the render filter 223 with the processing of the UI extension module 224, the printer driver is prevented from being uninstalled before the UI extension module 224 is activated. In the following, explanation of the contents in common to those of the first embodiment is omitted appropriately.

Figure 6:
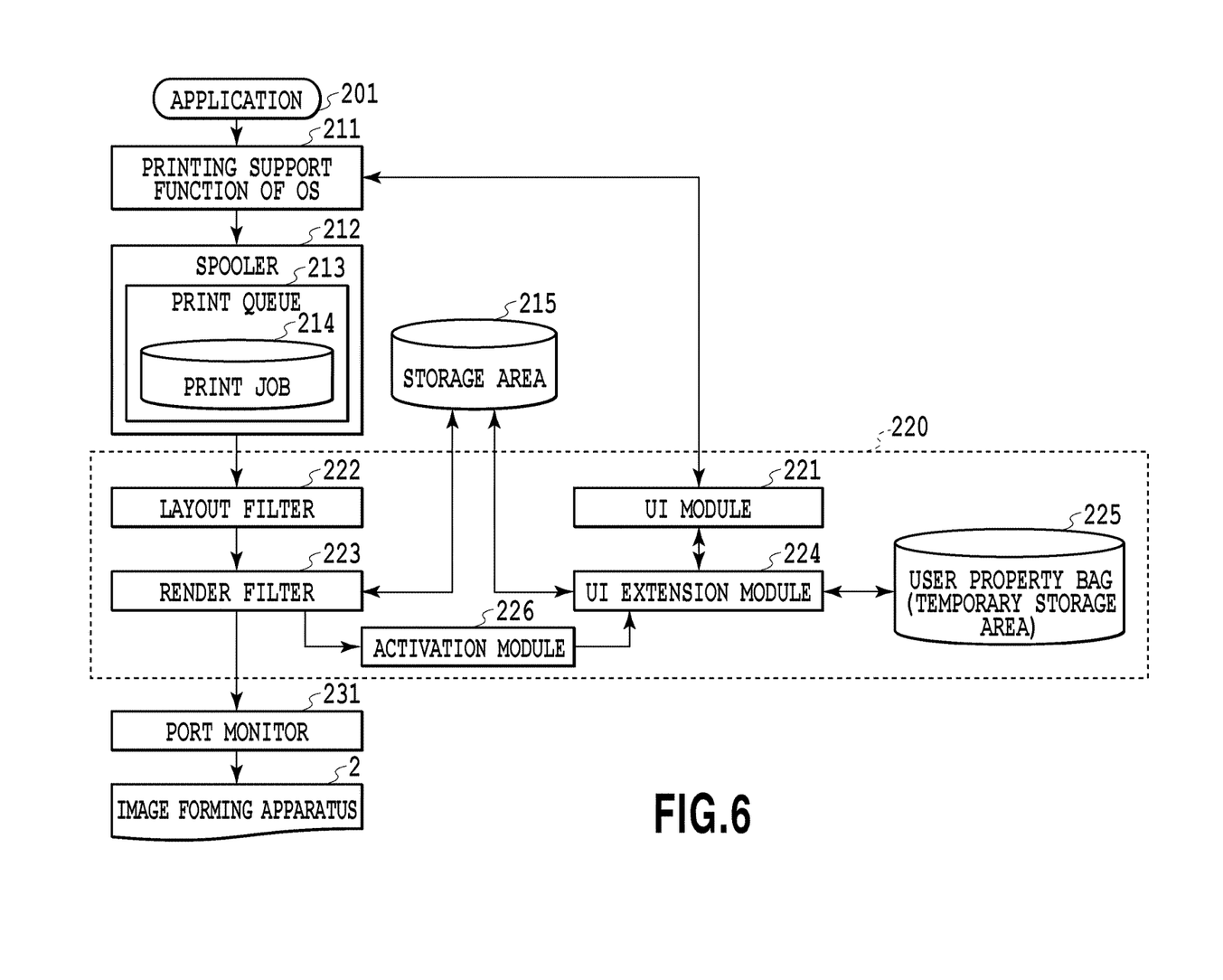
FIG. 6 is a block diagram showing a function configuration of the information processing apparatus 1 in a second embodiment.

In order to synchronize the processing of the render filter 223 with the processing of the UI extension module 224, a method is considered in which the render filter 223 directly activates the UI extension module 224. On the other hand, it is necessary to use a dedicated access function for the UI extension module 224 to access the user property bag 225. Because of this, it is necessary to deliver a necessary instance as an argument by using the API (Document Properties function) provided by the OS in order to activate the UI extension module 224. However, the render filter 223 is not a module that performs printing, and therefore, the render filter 223 cannot call the Document Properties function. Consequently, the activation module (EXE file) 226 to activate the UI extension module 224 is prepared and the render filter 223 indirectly activates the UI extension module 224 by activating the activation module 226.

<About Function Configuration>

FIG. 6 is a diagram showing an example of the function configuration of the PC 1 in the present embodiment. As shown schematically, the printer driver 220 further has the activation module 226 and this point differs from the first embodiment (see FIG. 2).

The activation module 226 activates the UI extension module 224 by calling the Document Properties function. Further, the UI extension module 224 determines the module that is the source of activation and in the case of being activated by the activation module 226, the UI extension module 224 performs processing that is different from the normal processing. This processing is, for example, processing to move the information on the external file existing in the storage area 215 to the user property bag 225. Further, the UI extension module 224 normally displays the GUI screen at the time of activation, but in the case of being activated by the activation module 226, the UI extension module 224 does not display the GUI screen. It is also considered that the processing performed by the UI extension module 224 is specified by the activation module 226 that is the source of call. In this case, there is a method of specifying the processing by using parameters at the time of activation, or a method of specifying the processing by using a shared file or a shared memory.

<About Processing Performed by Render Filter>

Figure 7:
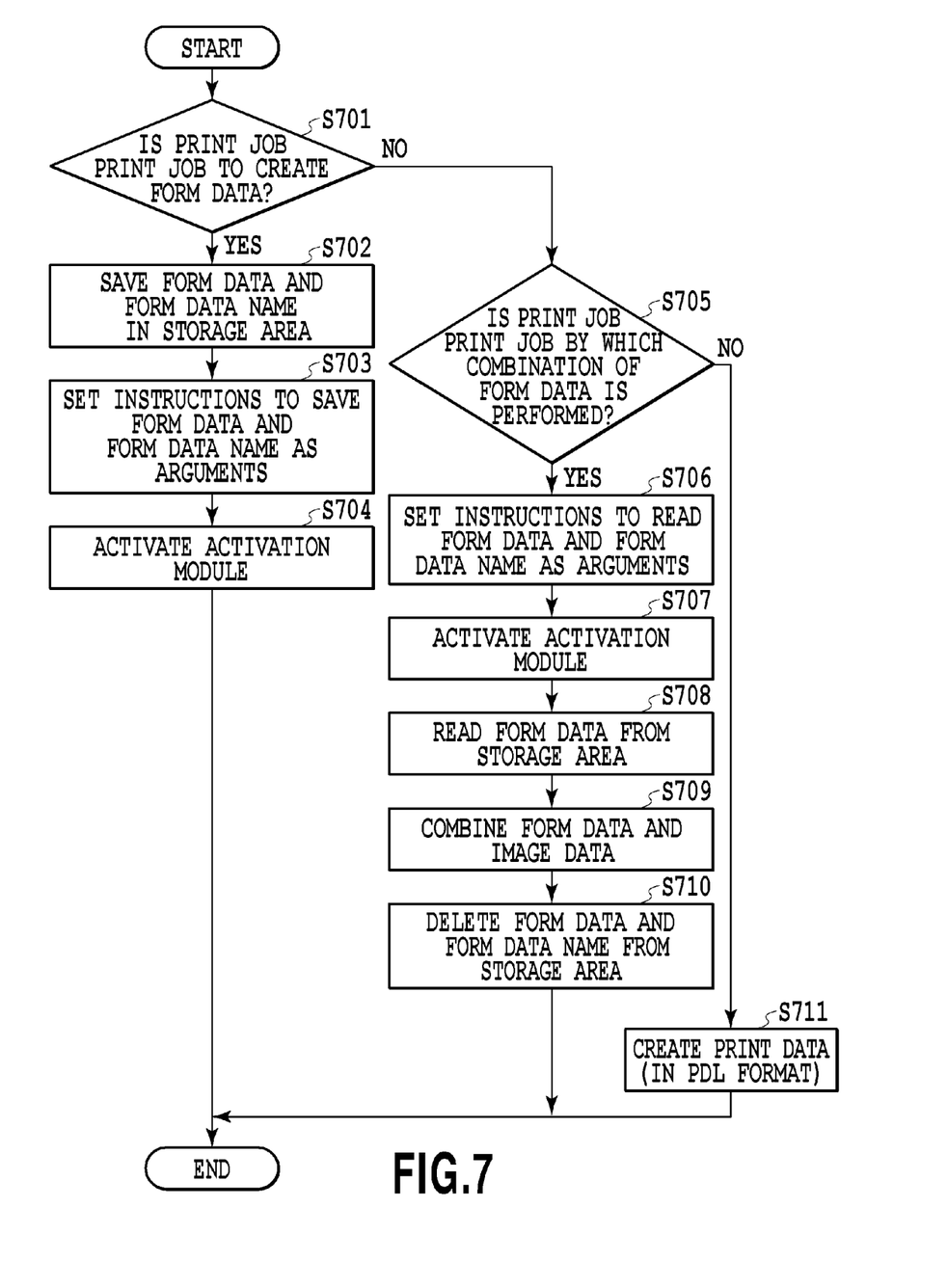
FIG. 7 is a flowchart of processing that is performed by the render filter 223 in the second embodiment.

FIG. 7 is a flowchart of processing that is performed by the render filter 223 in the present embodiment.

At step S701, the render filter 223 determines whether the processing-target print job is a job to create form data based on the print setting information included in the print job. In the case where the results of the determination at step S701 are affirmative, the processing advances to step S702. On the other hand, in the case where the results of the determination are negative, the processing advances to step S705.

At step S702, the render filter 223 creates form data and saves the form data and the form data name included in the print setting information in the storage area 215 in association with each other. It may also be possible to save the form data and the form data name together as one form file as in the first embodiment.

At step S703, the render filter 223 performs settings so that the form data saved in the storage area 215 at step S702 is saved in the user property bag 225. Specifically, the render filter 223 sets the instructions to save form data in the user property bag 225 and the form data name included in the print setting information as arguments.

At step S704, the render filter 223 activates the activation module 226 by using the arguments set at step S703. After step S704, the processing by the activation module 226 starts. The processing by the activation module 226 will be described later by using FIG. 8.

At step S705, the render filter 223 determines whether the processing-target print job is a print job by which combination of form data is performed, based on the print setting information included in the print job. In the case where the results of the determination at step S705 are affirmative, the processing advances to step S706. On the other hand, in the case where the results of the determination are negative, the processing advances to step S711.

Figure 9:
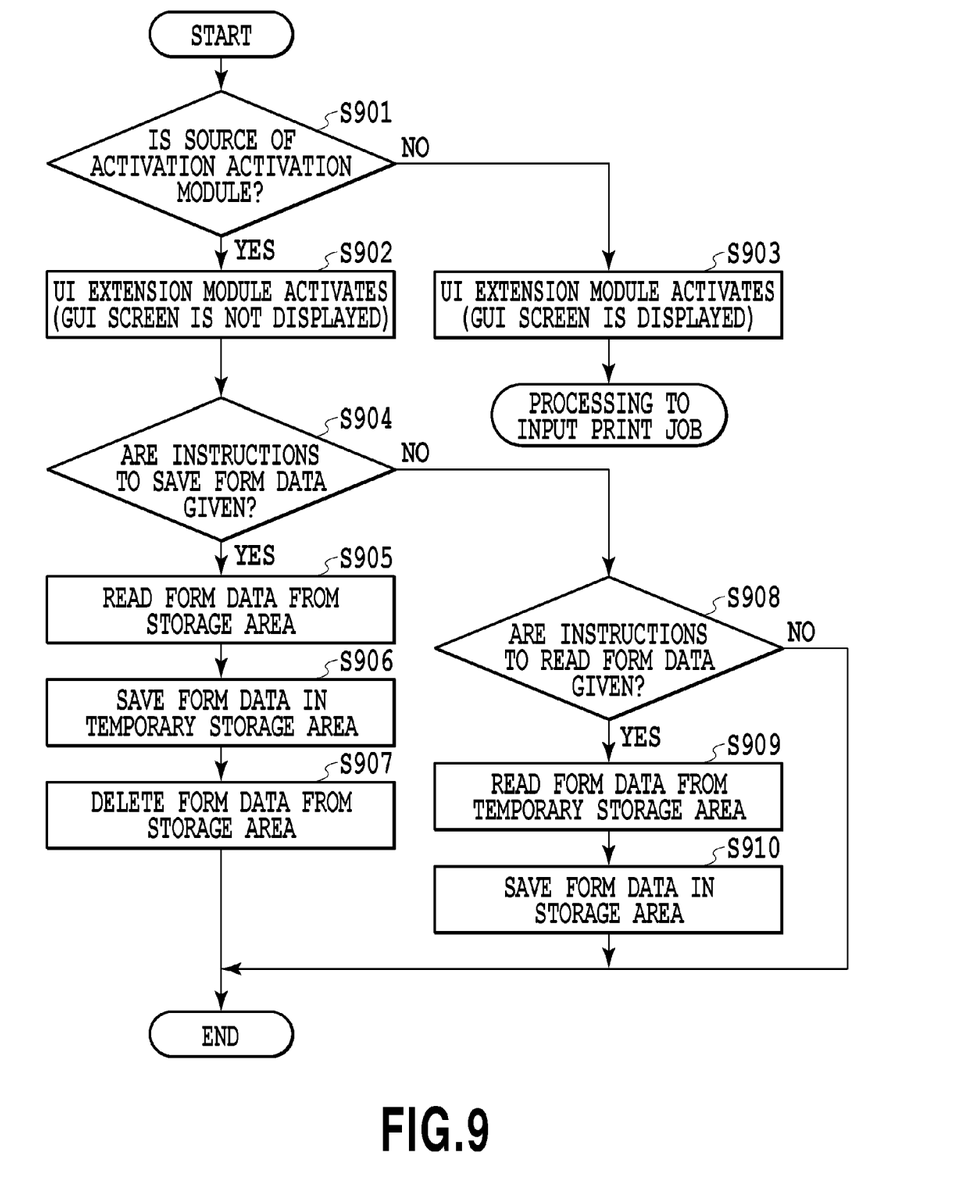
FIG. 9 is a flowchart of processing that is performed by the UI extension module 224 in the second embodiment.

At step S706, the render filter 223 performs settings so that the form data saved at step S906, to be described later, is read from the user property bag 225. Specifically, the render filter 223 sets the instructions to read form data from the user property bag 225 and the form data name included in the print setting information as arguments.

At step S707, the render filter 223 activates the activation module 226 by using the arguments set at step S706. After step S707, the processing by the activation module 226 starts.

At step S708, the render filter 223 reads the form data from the storage area 215, which is associated with the form data name that coincides with the form data name included in the print setting information.

At step S709, the render filter 223 combines the form data acquired at step S708 and the image data and creates print data in the PDL format.

At step S710, the render filter 223 deletes the form data read at step S708 and the form data name associated therewith from the storage area 215, and the series of processing ends. The above is the processing that is performed by the render filter 223 in the present embodiment.

<About Processing Performed by Activation Module>

Figure 8:
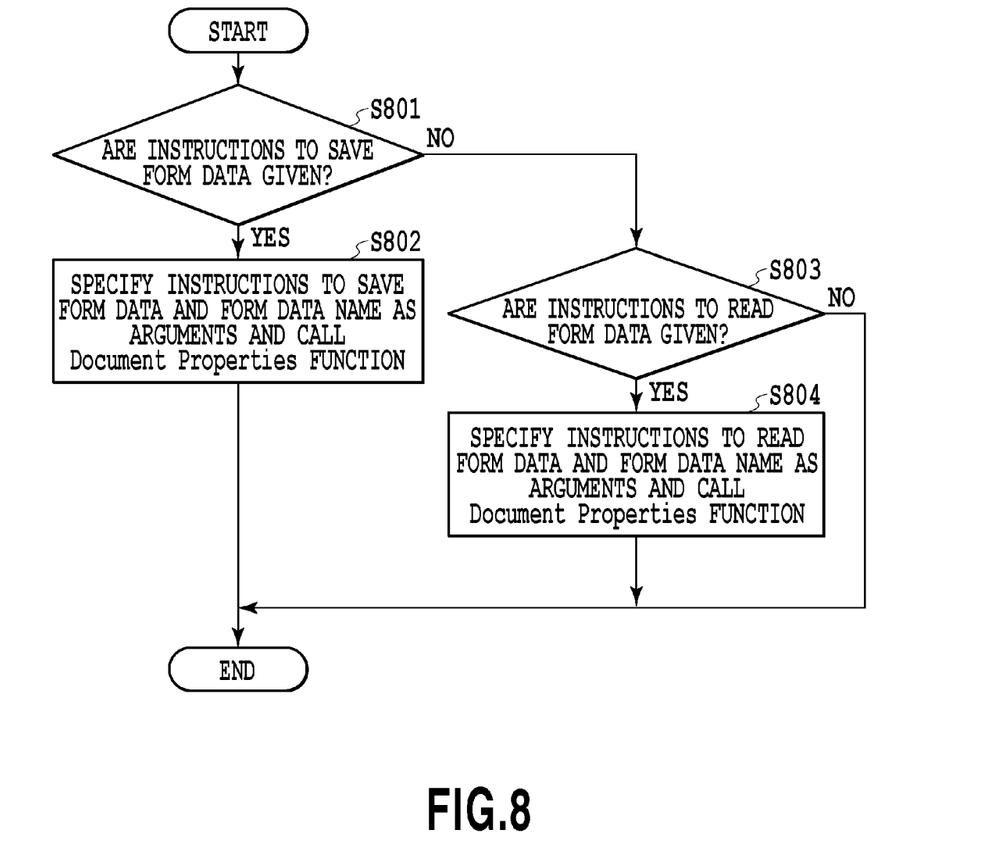
FIG. 8 is flowchart of processing that is performed by an activation module 226 in the second embodiment.

At step S801, the activation module 226 determines whether instructions to save form data in the user property bag 225 are given based on the set argument. In the case where the results of the determination at step S801 are affirmative, the processing advances to step S802. On the other hand, in the case where the results of the determination are negative, the processing advances to step S803.

At step S802, the activation module 226 specifies the instructions to save form data in the user property bag 225 and the form data name as arguments and calls the Document Properties function.

At step S803, the activation module 226 determines whether instructions to read form data from the user property bag 225 are given based on the set argument. In the case where the results of the determination at step S803 are affirmative, the processing advances to step S804. On the other hand, in the case where the results of the determination are negative, the series of processing ends.

At step S804, the activation module 226 specifies the instructions to read form data from the user property bag 225 and the form data name as arguments and calls the Document Properties function. The above is the processing that is performed by the activation module 226 in the present embodiment.

<About Processing Performed by UI Extension Module>

FIG. 9 is a flowchart of processing that is performed by the UI extension module 224 in the present embodiment.

At step S901, the UI extension module 224 determines whether the source of activation is the activation module 226. In the case where the results of the determination at step S901 are affirmative, the processing advances to step S902. On the other hand, in the case where the results of the determination are negative, the processing advances to step S903.

In the case where the source of activation of the UI extension module 224 is the activation module 226, the UI extension module 224 activates at step S902. However, at the time of activation, the UI extension module 224 does not display the GUI screen.

On the other hand, in the case where the source of activation of the UI extension module 224 is not the activation module 226, the UI extension module 224 activates at step S903. At the time of activation, the UI extension module 224 displays the GUI screen and following this step, processing to input a print job via the GUI screen is performed by a user.

In the following, processing at step S902 and subsequent steps in the case where the source of activation of the UI extension module 224 is the activation module 226 is explained. At step S904, the UI extension module 224 determines whether instructions to save form data in the user property bag 225 are given based on the argument. In the case where the results of the determination at step S904 are affirmative, the processing advances to step S905. On the other hand, in the case where the results of the determination are negative, the processing advances to step S908.

At step S905, the UI extension module 224 reads the form data from the storage area 215, which is associated with the form data name that coincides with the form data name specified by the argument.

At step S906, the UI extension module 224 saves the form data read at step S905 and the form data name specified by the argument in the user property bag 225 in association with each other.

At step S907, the UI extension module 224 deletes the form data read at step S905 and the form data name associated therewith from the storage area 215.

On the other hand, in the case where instructions to save form data are not given (in the case of NO at step S904), at step S908, the UI extension module 224 determines whether instructions to read form data from the user property bag 225 are given based on the argument. In the case where the results of the determination at step S908 are affirmative, the processing advances to step S909. On the other hand, in the case where the results of the determination are negative, the series of processing ends.

At step S909, the UI extension module 224 reads the form data from the user property bag 225, which is associated with the form data name that coincides with the form data name specified by the argument.

At step S910, the UI extension module 224 saves the form data read at step S909 and the form data name specified by the argument in the storage area 215 in association with each other. The above is the processing that is performed by the UI extension module 224 in the present embodiment.

In the present embodiment, by the render filter 223 activating the UI extension module 224 via the activation module 226, it is possible to synchronize the processing to save form data in the storage area 215 with the processing to delete the form data from the storage area 215. Because of this, it is made possible to prevent the case where the printer driver is uninstalled before the form data created and saved by the render filter 223 is deleted from the storage area 215.

In the present embodiment, explanation is given by using the form data that is used in the form combination printing as data for image formation, but of course it may also be possible to save another data. For example, in the case where it is desired to count the number of times each setting value of the UI is set and printed for each printing, and to save it as a log file, it is considered to save the log file in which the setting value is held as an external file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

According to the present invention, in the case where a printer driver has a function that is implemented by creating and saving an external file for the printer driver and by using the saved external file, it is possible to delete the external file that is no longer necessary after the uninstallation of the printer driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183102 filed Sep. 20, 2016, which is hereby incorporated by reference wherein in its entirety.

What is claimed is:

1. An information processing apparatus installed with a driver having a render filter that creates data for image formation and that saves the created data in a storage area that is not deleted at a time of uninstallation of the driver, the apparatus comprising:
   a saving unit configured to read the data saved in the storage area and to save the data in a temporary storage area that is deleted at a time of uninstallation of the driver;
   a deletion unit configured to delete the data from the storage area after the data is saved in the temporary storage area;
   a determination unit that determines whether or not the data for image formation which has been created by the render filter is stored in the storage area; and
   a control unit that reads data saved in the storage area, saves the data in the temporary storage area that is deleted at the time of uninstallation of the driver, and deletes the data from the storage area in a case where the determination unit determines that the data for image formation is saved in the storage area,
   wherein the saving unit, the deletion unit, the determination unit, and the control unit are implemented by at least one processor.

2. The information processing apparatus according to claim 1, further comprising:
   an activation unit configured to activate the control unit,
   wherein the render filter causes the control unit to perform saving and deletion by activating the control unit by using the activation unit in response to saving of the data in the storage area,
   wherein the activation unit is implemented by the at least one processor.

3. The information processing apparatus according to claim 2, wherein in a case where the render filter activates the control unit by using the activation unit, a GUI screen is not displayed.

4. The information processing apparatus according to claim 1, wherein the data for image formation is dedicated data of the driver.

5. The information processing apparatus according to claim 1, wherein the render filter cannot access the temporary storage area.

6. The information processing apparatus according to claim 1, wherein the driver is a printer driver that creates data for printing by a printer as data for image formation, and
   the information processing apparatus further comprise a second saving unit configured to read the data saved in the temporary storage area and to save the data in the storage area in a case where a processing-target print job is a print job by which combination of the data for image formation and image data is performed.

7. The information processing apparatus according to claim 6, further comprising:
a combination unit configured to read the data saved in the storage area by the saving unit configured to save data in the storage area and to combine the data and the image data,
wherein the combination unit is implemented by the at least one processor.

8. The apparatus according to claim 1, wherein the data for image formation is form data to be combined with image data.

9. A non-transitory computer readable storage medium storing a program which generates data for image formation and comprises a render filter that creates data for image formation and that saves the generated data in a storage area that is not deleted at a time of uninstallation of the program, the program causing a computer to function as:
a saving unit configured to read the data saved in the storage area by the render filter and to save the data in a temporary storage area that is deleted at a time of uninstallation of the program;
a deletion-unit configured to delete the data from the storage area after the data is saved in the temporary storage area by the saving unit;
a determination unit configured to determined whether or not the data for image formation which has been created by the render filter is stored in the storage area; and
a control unit configured to read data saved in the storage area, to save the data in the temporary storage area that is deleted at the time of uninstallation of the program, and to delete the data from the storage area in a case where the determination unit determines that the data for image formation is saved in the storage area.

10. The non-transitory computer readable storage medium according to claim 9, further comprising:
an activation unit configured to activate the saving unit and the deletion unit,
wherein the render filter causes the saving unit to perform saving and causes the deletion unit to perform deletion by activating the saving unit and the deletion unit by using the activation unit in response to saving of the data in the storage area.

11. The non-transitory computer readable storage medium according to claim 10, wherein in a case where the render filter activates the saving unit and the deletion unit by using the activation unit, a GUI screen is not displayed.

12. The non-transitory computer readable storage medium according to claim 9, wherein the data for image formation is dedicated data of the program.

13. The non-transitory computer readable storage medium according to claim 9, wherein the render filter cannot access the temporary storage area.

14. The non-transitory computer readable storage medium according to claim 9, wherein the driver is a printer driver that creates data for printing by a printer as data for image formation.

15. The non-transitory computer readable storage medium according to claim 14, further comprising:
a second saving unit configured to read the data saved in the temporary storage area and to save the data in the storage area in a case where a processing-target print job is a print job by which combination of the data for image formation and image data is performed.

16. The non-transitory computer readable storage medium according to claim 15, further comprising:
a combination unit configured to read the data saved in the storage area by the saving unit configured to save data in the storage area and to combine the data and image data.

17. The non-transitory computer readable storage medium according to claim 9, wherein the data for image formation is form data to be combined with image data.

18. An information processing method that is performed in an information processing apparatus installed with a driver that creates data for image formation and has a render filter that saves the created data in a storage area that is not deleted at a time of uninstallation of the driver, the method comprising:
determining whether or not the data for image formation which has been created by the render filter is stored in the storage area; and
reading the data saved in the storage area, saving the data in a temporary storage area that is deleted at a time of uninstallation of the driver, and
deleting the data from the storage area in a case where it is determined that the data for image formation is stored in the storage area.

* * * * *